(12) United States Patent
Breuckmann et al.

(10) Patent No.: US 12,151,724 B2
(45) Date of Patent: Nov. 26, 2024

(54) DISPLAYING A GRAPHICAL REPRESENTATION OF INFORMATION BY MEANS OF MULTIPLE SUB-DISPLAYS

(71) Applicant: Siemens Mobility GmbH, Munich (DE)

(72) Inventors: Christian Breuckmann, Erlangen (DE); Andreas Pirchmoser, Erlangen (DE)

(73) Assignee: Siemens Mobility GmbH, Munich (DE)

( * ) Notice: Subject to any disclaimer, the term of this patent is extended or adjusted under 35 U.S.C. 154(b) by 0 days.

(21) Appl. No.: 18/245,921

(22) PCT Filed: Sep. 7, 2021

(86) PCT No.: PCT/EP2021/074551
§ 371 (c)(1),
(2) Date: Mar. 20, 2023

(87) PCT Pub. No.: WO2022/058197
PCT Pub. Date: Mar. 24, 2022

(65) Prior Publication Data
US 2023/0382442 A1 Nov. 30, 2023

(30) Foreign Application Priority Data
Sep. 18, 2020 (DE) ...................... 10 2020 211 717.9

(51) Int. Cl.
*G09G 3/00* (2006.01)
*B61L 15/00* (2006.01)
*B61L 25/08* (2006.01)

(52) U.S. Cl.
CPC ............. *B61L 15/009* (2013.01); *B61L 25/08* (2013.01); *G09G 3/001* (2013.01); *G09G 2300/023* (2013.01); *G09G 2370/00* (2013.01)

(58) Field of Classification Search
CPC ....... B61L 15/009; B61L 25/08; G09G 3/001; G09G 2300/023; G09G 2370/00
See application file for complete search history.

(56) References Cited

U.S. PATENT DOCUMENTS

| | | |
|---|---|---|
| 5,805,134 A | 9/1998 | Seki et al. |
| 9,592,844 B2 | 3/2017 | Porsch et al. |

FOREIGN PATENT DOCUMENTS

| | | |
|---|---|---|
| DE | 102005011942 A1 | 9/2006 |
| DE | 102008021241 A1 | 10/2009 |

(Continued)

*Primary Examiner* — Deeprose Subedi
(74) *Attorney, Agent, or Firm* — Laurence A. Greenberg; Werner H. Stemer; Ralph E. Locher

(57) ABSTRACT

A display device for displaying a graphical representation of information. The display device includes a first interface for receiving the information via a first transfer path, a second interface for receiving the information via a second transfer path. A first sub-display is designed to display a first sub-region of the graphical representation using the information received by the first interface, and a second sub-display is designed to display a second sub-region of the graphical representation using the information received by the second interface. The first and second sub-display form a complete display which is configured to display the graphical representation. The first sub-display and the second sub-display are arranged one behind the other in a viewing direction.

7 Claims, 6 Drawing Sheets

(56) References Cited

FOREIGN PATENT DOCUMENTS

| | | | |
|---|---|---|---|
| DE | 102012221370 A1 * | 5/2014 | .............. B61L 25/08 |
| WO | 2013045478 A1 | 4/2013 | |
| WO | 2019016102 A1 | 1/2019 | |

* cited by examiner

DISPLAYING A GRAPHICAL REPRESENTATION OF INFORMATION BY MEANS OF MULTIPLE SUB-DISPLAYS

FIELD AND BACKGROUND OF THE INVENTION

The invention relates to a display apparatus for displaying a graphical representation of an item of information.

In principle, display apparatuses for displaying a graphical representation are known. For example, display apparatuses include liquid crystal displays (LCDs), organic light-emitting diodes (OLEDs), head-up displays (HUDs), etc.

WO 2013/045478 A1 describes a locomotive driver's cab with a front viewing display for displaying rail vehicle-relevant information in the field of view of the locomotive driver, in which the front pane of the rail vehicle is a projection area of the front view display. In this context, two simultaneous items of information from different systems are applied to an imaging unit. The imaging unit emits optical signals with different colors on the basis of the information from the different systems. An optical module of the front pane display contains two mirror systems oriented in such a manner that the optical signals belonging to different items of information strike the projection area at the same point.

SUMMARY OF THE INVENTION

Against this background, the object of the invention is to specify an improved display apparatus for displaying a graphical representation of an item of information, in particular a safety-relevant item of information.

The object is achieved by the display apparatus for displaying the graphical representation of the information. The display apparatus comprises a first interface for receiving the information via a first transfer path and a second interface for receiving the information via a second transfer path. The display apparatus further comprises a first partial display, which is embodied to display a first partial region of the graphical representation on the basis of the information received by the first interface, and a second partial display, which is embodied to display a second partial region of the graphical representation on the basis of the information received by the second interface. The first and second partial display form an overall display, which is embodied to display the graphical representation, wherein the first partial display and the second partial display are arranged one behind the other in the viewing direction.

The invention is based on the knowledge that trustworthy and safe displays are desirable, which at the same time achieve a high level of flexibility. For example, a safe display is desirable, which can be shown and hidden by the user at any time without safety-related restrictions.

It has also been identified by the invention that previous safe displays are characterized by elaborate process protection. In this context, it is ensured via different communication steps with the information source that the information represented by the display system is correct.

The solution according to the invention resolves these problems by the information being represented via at least two independent partial displays, wherein only the combined overall display represents the information completely and correctly. The partial displays are arranged one behind the other in the viewing direction. In this manner, the viewer can identify whether or not the display is correct. If one of the two partial displays is represented in an incorrect or falsified manner, then the viewer can clearly and simply identify that the information is not represented correctly.

If one of the two partial displays is missing, then the viewer can directly identify that the information is incomplete. If the two partial displays display different information, then an invalid overall display of the information is produced, which can be directly identified by the viewer.

The solution according to the invention also achieves an operation of the display apparatus with an increased safety level, wherein it is possible to use components of the display apparatus which themselves could not achieve this increased safety level. This is because the trustworthiness of the display can be ascertained by the viewer directly when viewing the display.

One example of a combined overall display is the representation of a braking percentage as a number. In this context, each numeric digit (numeral) of the number is divided into the at least two partial regions and each partial display represents a part of the number. If the two partial displays show the same number, then a correct graphical representation of the number is produced for the viewer. If one of the two partial displays shows the number in a falsified manner (for example a different number in the second partial region), then the number to be displayed is represented in the first partial region and the other number is represented in the second partial region. An incorrect overall display is therefore produced for the viewer, which they can clearly identify.

The person skilled in the art preferably understands the wording whereby "the first partial display and the second partial display are arranged one behind the other in the viewing direction" to mean that the first partial display and the second partial display are arranged one behind the other in the direction of the light emitted by the respective partial display. In a further preferable manner, the light emitted by the first or second partial display penetrates the second or first partial display, respectively, on its way to the viewer. In other words: the first and/or second partial display are at least partially permeable to light (transparent).

The first partial display and second partial display can have separate display units. Alternatively, the first partial display and second partial display can be two layers of one display unit.

Different divisions of the first and second partial region within the overall display are conceivable. In particular, the first partial region and second partial region are arranged next to one another when viewed in the viewing direction. The partial regions can be adjacent to one another or at a distance from one another when viewed in the viewing direction. The partial regions can also at least partially or completely overlap one another.

Even if two partial displays, two partial regions, two interfaces, etc. are described in the present case and in the following, the invention includes a display apparatus with more than two partial displays, more than two partial regions, more than two interfaces, etc. from the inventive idea.

According to a preferred embodiment of the display apparatus according to the invention, when viewed in the viewing direction, the first partial region forms an upper partial region and the second partial region forms a lower partial region. In this division of the first and second partial region, an incorrect display can be perceived in a particularly simple and intuitive manner.

According to a further preferred embodiment of the display apparatus according to the invention, the first partial region forms a left partial region and the second partial region forms a right partial region. An incorrect display can also be perceived in a particularly simple and intuitive manner in this division of the first and second partial region.

In a further preferred embodiment of the display apparatus according to the invention, the first partial region and the second partial region are separated by a diagonal when viewed in the viewing direction. Accordingly, the first partial region appears as an area on one side of the diagonal, and the second partial region appears as an area on the other side of the diagonal.

According to a further particularly preferred embodiment of the display apparatus according to the invention, the second partial display is a rear partial display in the viewing direction (in other words: the second partial display lies behind the first partial display in the viewing direction). The second partial display shows the graphical representation in an incorrect color in a third partial region, in which the first partial region and the second partial region overlap when viewed in the viewing direction.

This has the advantage that, on the basis of the missing color displayed in the third partial region, it is identified that the first partial display is missing or is not displaying anything due to an error.

The third partial region corresponds to the first partial region, for example. Example: the first partial region, which is displayed by the first partial display, which is a front partial display in the viewing direction, is a left partial region. The second partial region extends over the left and right part of the graphical representation. This means that the left partial region is a third partial region, in which the first partial region and the second partial region overlap. The second partial display shows the graphical representation with an incorrect color in the third partial region. While the first partial display is showing the first partial region of the graphical representation, this covers the third partial region shown by the second partial display. If the first partial display is missing or is not displaying anything due to an error, then the viewer perceives the third partial region in the incorrect color.

According to a further preferred embodiment of the display apparatus according to the invention, the first partial region comprises a plurality of sub-partial regions, which are not contiguous when viewed in the viewing direction. Alternatively or additionally, the second partial region comprises a plurality of sub-partial regions, which are not contiguous when viewed in the viewing direction. One or more sub-partial regions of the first partial region, in parts, can be adjacent to one or more sub-partial regions of the second partial region.

According to a further preferred embodiment of the display apparatus according to the invention, the information is a safety-relevant item of information, which relates to the safety of a rail-bound vehicle. This represents a particularly expedient application case of the display apparatus according to the invention. Particularly in rail-bound vehicles, the correct representation of safety-relevant information is important for the safety of the passengers and the surrounding area of the vehicle.

The person skilled in the art preferably understands the term "safety-relevant" as relevant to the safety of the rail-bound vehicle.

Preferably, the information is provided by a single safe information source.

The invention further relates to a display system for displaying a graphical representation of an item of information. The display system comprises an information source, which provides an item of information, a first transfer path, which is embodied to transfer the information to a first interface of a display apparatus, and a second transfer path, which is embodied to transfer the information to a second interface of the display apparatus. The display system further comprises a first partial display, which is embodied to display a first partial region of the graphical representation on the basis of the information received by the first interface, and a second partial display, which is embodied to display a second partial region of the graphical representation on the basis of the information received by the second interface. The first and second partial display form an overall display, which is embodied to display the graphical representation. The first partial display and the second partial display are arranged one behind the other in the viewing direction.

The invention further relates to a rail-bound vehicle with a display system of the kind described above.

The invention further relates to a method for displaying a graphical representation of an item of information, comprising: receiving the information by means of a first interface via a first transfer path, receiving the information by means of a second interface via a second transfer path, displaying a first partial region of the graphical representation on the basis of the information received by the first interface and displaying a second partial region of the graphical representation on the basis of the information received by the second interface. The first and second partial display form an overall display, which is embodied to display the graphical representation. The first partial display and the second partial display are arranged one behind the other in the viewing direction.

Preferably, the information is provided by a single information source. In a further preferable manner, the information is sent from the information source via the first transfer path to the first interface and via the second transfer path to the second interface.

Exemplary embodiments of the invention will be explained, making reference to the drawings, in which:

DETAILED DESCRIPTION OF THE INVENTION

Figure 1:
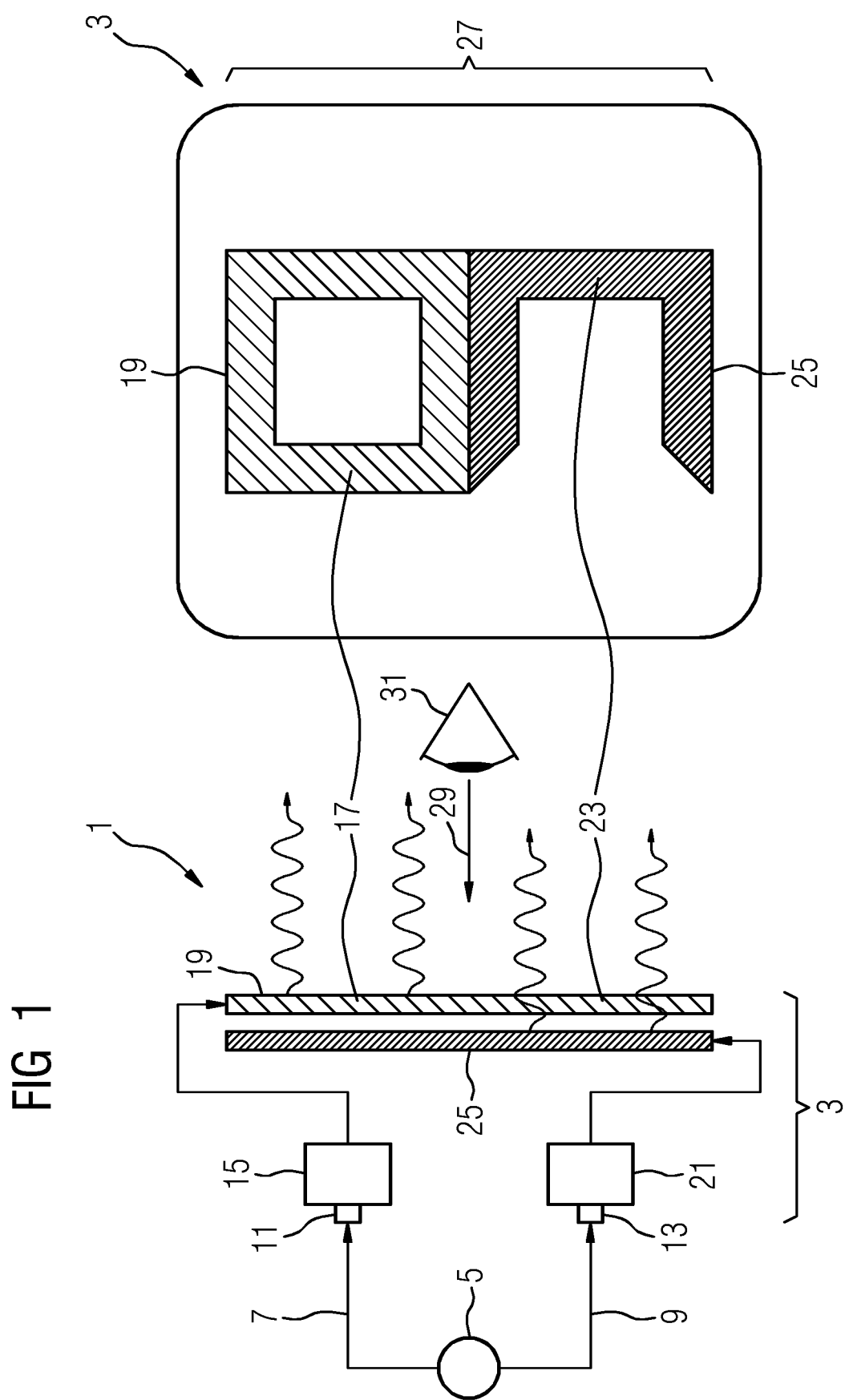
FIG. 1 schematically shows the structure of a display system according to the invention, FIG. 2 schematically shows the structure of a rail-bound vehicle according to the invention, FIG. 3 schematically shows an exemplary embodiment of a display apparatus according to the invention, FIG. 4 schematically shows a further exemplary embodiment of a display apparatus according to the invention, FIG. 5 schematically shows a further exemplary embodiment of a display apparatus according to the invention.

FIG. 1 shows a display system 1 with a display apparatus 3. The display system 1 comprises an information source 5, which provides an item of information to be represented. The information is transferred via two independent transfer paths 7 and 9 to an interface 11 or 13, respectively, of the display apparatus 3.

The information received by the first interface 11 is processed by means of a first display control unit 15 in such a manner that a first partial region 17 of a graphical representation of the information is displayed by means of a first partial display 19 of the display apparatus 3. The information received by the second interface 13 is processed by means of a second display control unit 21 in such a manner that a second partial region 23 of the graphical representation of the information is displayed by means of a second partial display 25 of the display apparatus 3.

The first partial display 19 and second partial display 25 together form an overall display 27. When viewed in the viewing direction 29 of a viewer 31, the first partial display 19 and the second partial display 25 are arranged one behind the other.

FIG. 1 shows on the right an exemplary top view of the display apparatus 3, i.e. a view in the viewing direction 29 of the viewer 31. In this context, the first partial region 17 forms an upper partial region and the second partial region 23 forms a lower partial region. With the structure of the display apparatus 3 shown in FIG. 1, however, other divisions, such as those shown in FIGS. 3 to 6, can also be represented.

Figure 2:
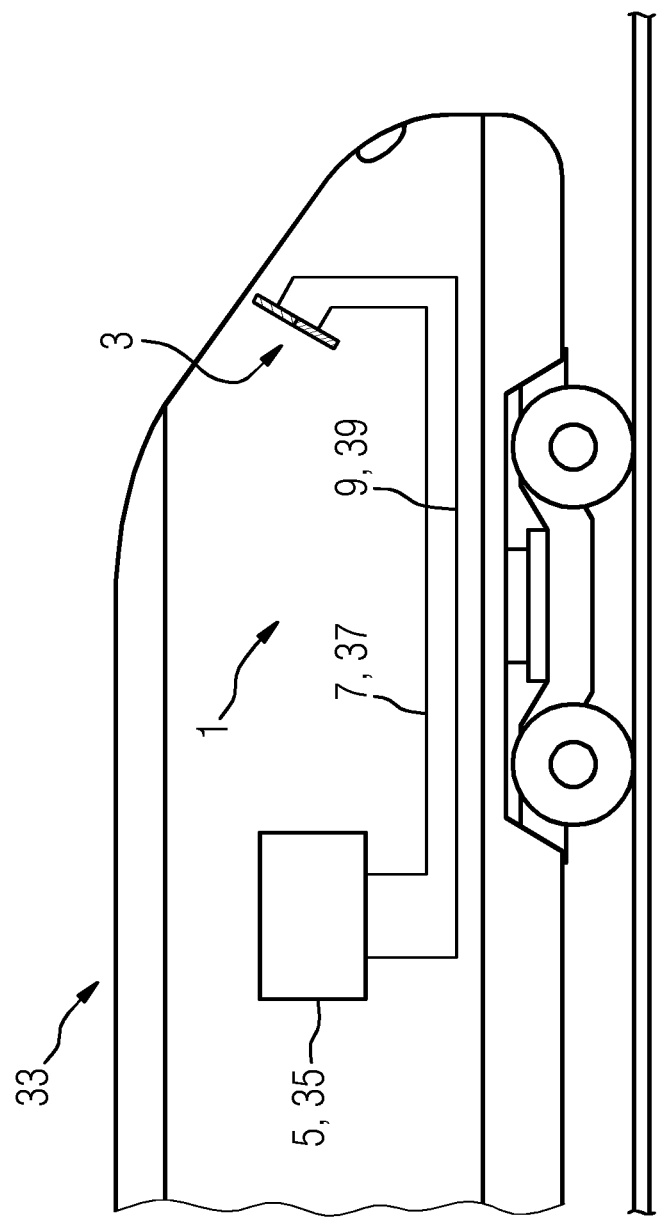

FIG. 2 shows an exemplary embodiment of a rail-bound vehicle 33 according to the invention, in which a display apparatus 3 according to the invention of the kind described above is used. In this context, identical and functionally identical elements are provided with the same reference characters as in FIG. 1.

In the exemplary embodiment shown in FIG. 2, the information source 5 is a central controller 35, which provides a braking percentage as information. The braking percentage is an example of an item of information which relates to the safety of the rail-bound vehicle 33. The information is transferred to the display apparatus 3 via two independent transfer paths 7 and 9, for example two independent communication cables 37 and 39 or two independent communication telegrams. The independent communication telegrams can be transferred via a vehicle bus.

Figure 3:
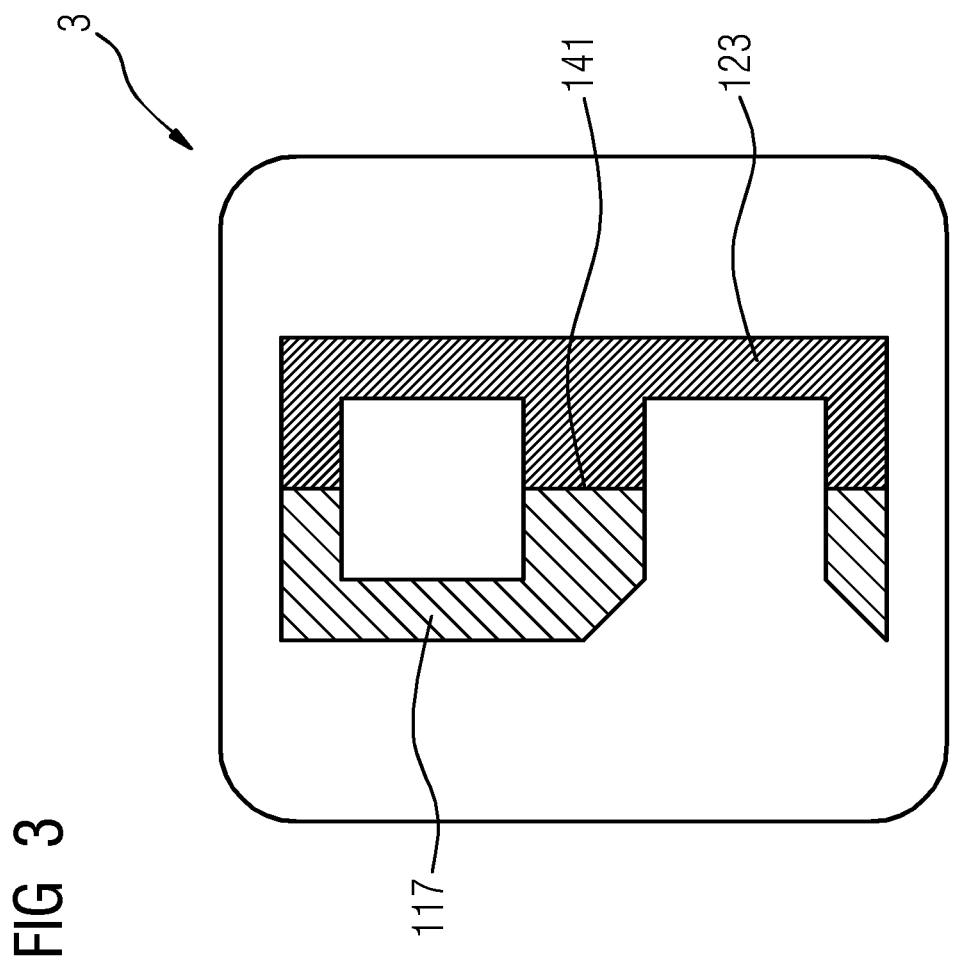

FIG. 3 shows a further example of a division of the first and second partial region 117 and 123 in a top view of the display apparatus 3 when viewed in the viewing direction 29 of the viewer 31. The graphical representation of the information is separated along the vertical 141. In this context, the first partial region 117 forms an area that is arranged on the left side of the vertical 141, and the second partial region 123 forms an area that is arranged on the right side of the vertical 141.

Figure 4:
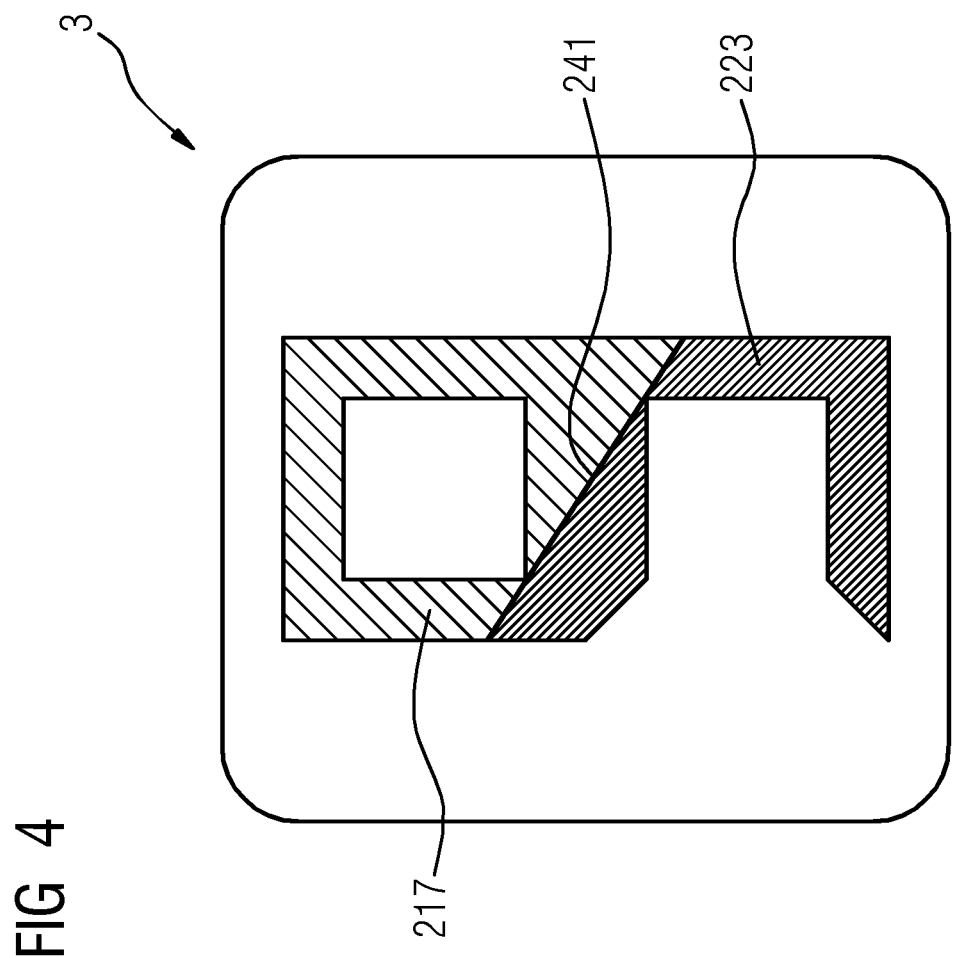

FIG. 4 shows a further example of a division of the first and second partial region 217 and 223 in a top view of the display apparatus 3 when viewed in the viewing direction 29 of the viewer 31. The graphical representation of the information is separated along the diagonal 241. In this context, the first partial region 217 forms an area that is arranged on one side of the diagonal 241, and the second partial region 223 forms an area that is arranged on the other side of the diagonal 241.

Figure 5:
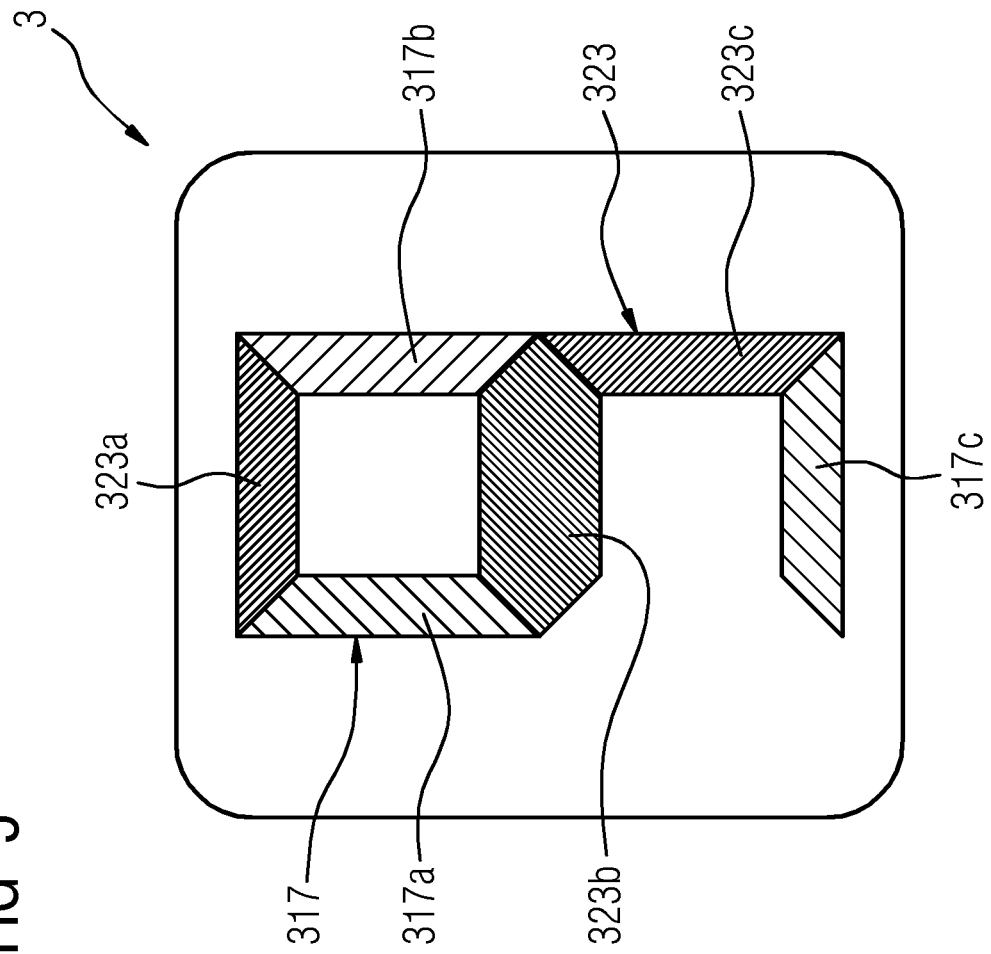

FIG. 5 shows a further example of a division of the first and second partial region 317 and 323 in a top view of the display apparatus 3 when viewed in the viewing direction 29 of the viewer 31. In this context, the first partial region 317 is composed of a plurality of sub-partial regions 317a, 317b and 317c, which do not form a contiguous area. The second partial region 323 is also composed of a plurality of sub-partial regions 323a, 323b and 323c, which do not form a contiguous area (i.e. 323b and 323c form a contiguous area, but not with 323a). In the exemplary embodiment shown in FIG. 5, the sub-partial regions 317a, 317b, 317c, 323a, 323b and 323c are segments of what is known as a seven-segment display, wherein by way of example the numeral "9" is shown in FIG. 5. The sub-partial regions are distributed in such a manner that a correct Arabic numeral cannot be displayed by just one of the two partial regions.

Figure 6:
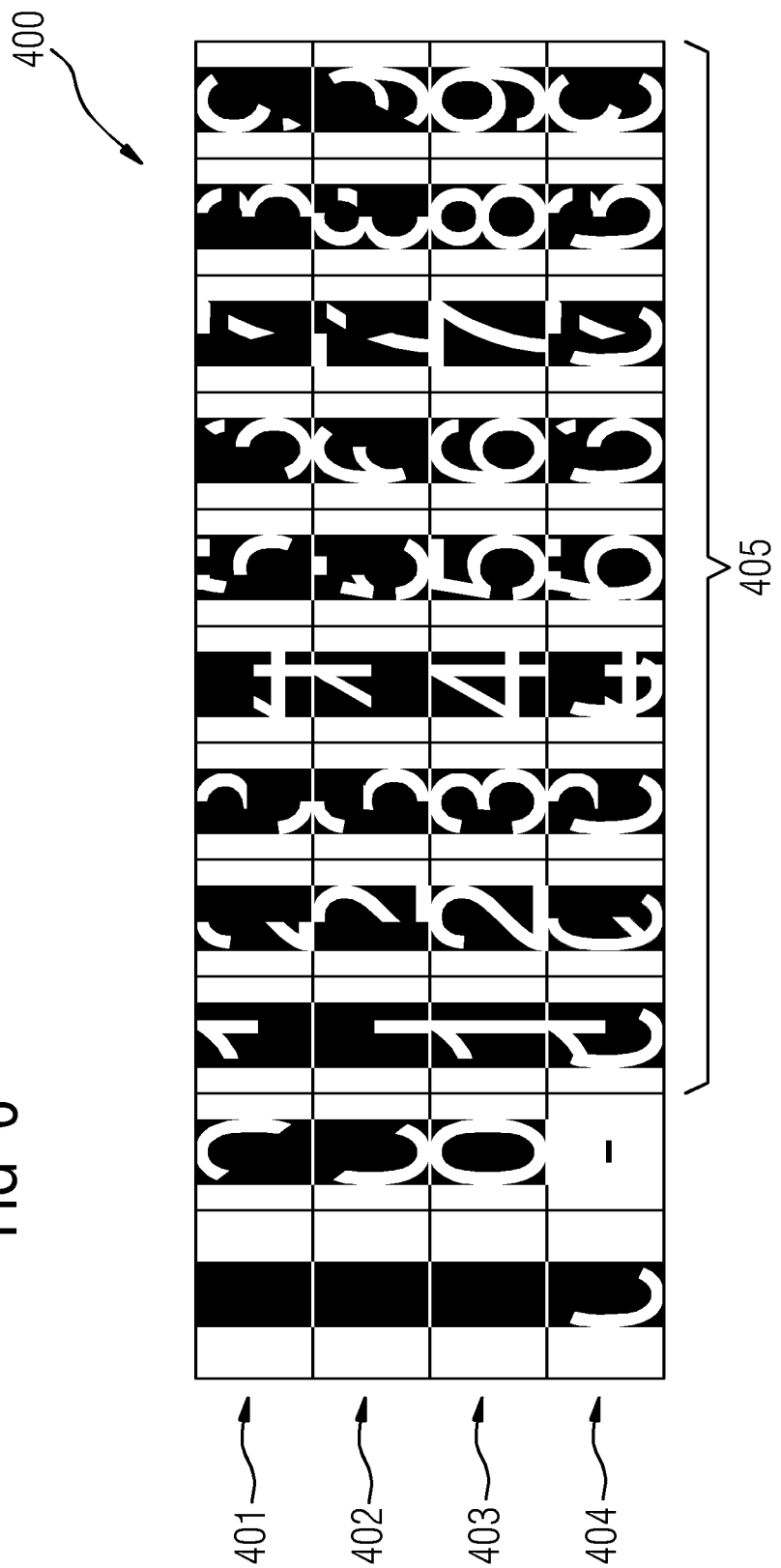
FIG. 6 shows exemplary embodiments of a display within the meaning of the invention in the form of a table.

By way of example, FIG. 6 shows a display of the numerals 0 to 9 according to an exemplary embodiment of the invention in the form of a table.

The first row 401 of the table 400 shows the first partial region of the graphical representation of the respective numeral. The second row 402 of the table shows the second partial region of the graphical representation of the respective numeral.

For example, the numeral "1" is divided into an upper and lower partial region. The numeral "2" is divided into a left and right partial region. For the numeral "3", the first partial region is composed of a first sub-partial region, which lies in an upper-right quadrant, and of a second sub-partial region, which lies in a lower-left quadrant. Accordingly, the second partial region is composed of a first sub-partial region, which lies in an upper-left quadrant, and a second sub-partial region, which lies in a lower-right right quadrant.

The third row 403 of the table shows the graphical representation of the respective numeral, which is composed of the partial regions shown in the first row 401 and second row 402.

The fourth row 404 shows a constellation in which a partial region of the numeral "0" is displayed as an incorrect numeral by the second partial display 25. The columns 405 of the row 404 shows the combination of the numerals 1-9, which are displayed by the first partial display, with the incorrect "0". The faulty display can be clearly and intuitively identified in this context.

Although the invention has been illustrated and described in detail by way of the preferred exemplary embodiment, the invention is not restricted by the examples disclosed and other variations can be derived therefrom by the person skilled in the art without departing from the protective scope of the invention.

The invention claimed is:

1. A display apparatus for displaying a graphical representation of an item of information, the display apparatus comprising:
   a first interface for receiving the information via a first transfer path;
   a second interface for receiving the information via a second transfer path;
   a first partial display configured to display a first partial region of the graphical representation based on the information received by said first interface;
   a second partial display configured to display a second partial region of the graphical representation based on the information received by said second interface;
   said first partial display and said second partial display together forming an overall display that is configured to display the graphical representation;
   said first partial display and said second partial display being arranged one behind another in a viewing direction; and
   said first partial region and said second partial region being separated from one another by a diagonal when viewed in the viewing direction.

2. The display apparatus according to claim 1, wherein said second partial display is a rear partial display in the viewing direction, and said second partial display is configured to show the graphical representation in an incorrect color in a third partial region, in which the first partial region and the second partial region overlap, as viewed in the viewing direction.

3. The display apparatus according to claim 1, wherein the first partial region is formed of a plurality of sub-partial regions, which are not contiguous as viewed in the viewing direction, and/or the second partial region is formed of a plurality of sub-partial regions, which are not contiguous as viewed in the viewing direction.

4. The display apparatus according to claim 1, wherein the information is a safety-relevant item of information that relates to a safety of a rail-bound vehicle.

5. A display system for displaying a graphical representation of an item of information, the display system comprising:
- an information source configured to provide an item of information;
- a first transfer path for transferring the information to a first interface of a display apparatus;
- a second transfer path for transferring the information to a second interface of a display apparatus;
- a first partial display configured to display a first partial region of the graphical representation based on the information received by the first interface;
- a second partial display configured to display a second partial region of the graphical representation based on the information received by the second interface;
- said first partial display and said second partial display forming an overall display that is configured to display the graphical representation;
- said first partial display and said second partial display being arranged one behind another in a viewing direction; and
- said first partial region and said second partial region are separated from one another by a diagonal when viewed in the viewing direction.

6. A rail-bound vehicle, comprising a display system according to claim 5.

7. A method for displaying a graphical representation of an item of information, the method comprising:
- providing a display with a first partial display and a second partial display, wherein the first and second partial displays are arranged one behind another in a viewing direction;
- receiving the information by a first interface via a first transfer path;
- receiving the information by a second interface via a second transfer path;
- displaying a first partial region of the graphical representation on a basis of the information received by the first interface;
- displaying a second partial region of the graphical representation on a basis of the information received by the second interface;
- with the first and second partial displays forming an overall display displaying the graphical representation of the item of information; and
- said first partial region and said second partial region being separated from one another by a diagonal when viewed in the viewing direction.

* * * * *